(«12») United States Patent
Spooner (10) Patent No.: US 8,743,891 B2
(45) Date of Patent: Jun. 3, 2014

(54) DATA PACKET ROUTER FOR A MOBILE COMMUNICATION DEVICE

(75) Inventor: David Spooner, Greenford (GB)

(73) Assignee: Nokia Corporation, Espoo (FI)

( * ) Notice: Subject to any disclaimer, the term of this patent is extended or adjusted under 35 U.S.C. 154(b) by 545 days.

(21) Appl. No.: 10/487,645

(22) PCT Filed: Aug. 27, 2002

(86) PCT No.: PCT/GB02/03923
§ 371 (c)(1),
(2), (4) Date: Feb. 24, 2004

(87) PCT Pub. No.: WO03/019865
PCT Pub. Date: Mar. 6, 2003

(65) Prior Publication Data
US 2005/0025161 A1    Feb. 3, 2005

(30) Foreign Application Priority Data

Aug. 24, 2001   (GB) .................................. 0120686.1

(51) Int. Cl.
*H04L 12/66*     (2006.01)
*H04L 12/28*     (2006.01)
*H04L 29/06*     (2006.01)
*G06F 9/44*      (2006.01)
*G06F 9/445*     (2006.01)
*H04W 88/16*     (2009.01)
*H04L 29/12*     (2006.01)

(52) U.S. Cl.
CPC ................ *H04L 12/66* (2013.01); *H04L 69/18* (2013.01); *G06F 9/4411* (2013.01); *G06F 9/44521* (2013.01); *H04W 88/16* (2013.01); *H04L 61/2038* (2013.01); *H04L 61/2084* (2013.01)
USPC .......................................... 370/401; 370/419

(58) Field of Classification Search
USPC ........................................ 370/328, 338, 401
See application file for complete search history.

(56) References Cited

U.S. PATENT DOCUMENTS 5,636,211 A    6/1997  Newlin et al.
5,884,190 A    3/1999  Lintula et al.
(Continued)

FOREIGN PATENT DOCUMENTS

CA    2 324 862 A1    5/2001
CA    2 332 164 A1    7/2001
(Continued)

OTHER PUBLICATIONS

U.K—Search Report, Date of Search Sep. 27, 2002; Application No. GB0219900.8; Claims Searched 1-37—2 pages.

(Continued)

*Primary Examiner* — Marcus R Smith
(74) *Attorney, Agent, or Firm* — Alston & Bird LLP (57) ABSTRACT

A data packet router enables a mobile communication device to access a WAN such as the Internet via a PC connected to the WAN. The router comprises bearer plug-in modules which each enable connection between the mobile communication device and the computer over a different bearer. The PC is therefore used as an internet access point for mobile communication devices which can use any conventional bearer to connect to the PC (USB, RS232, Bluetooth wireless etc.). Hence, a mobile telephone could gain web access using conventional WAP or, with the present invention, it could also be connected to a PC using a convenient bearer and hence gain access to the internet via the PC. Because the router uses bearer plug-in modules, it is possible to write new bearer modules as and when new bearers are developed and to readily add them to upgrade existing implementations. This is valuable since new connectivity standards (and enhancements to old standards) are continually under development.

34 Claims, 9 Drawing Sheets

(56) References Cited

U.S. PATENT DOCUMENTS

| | | | |
|---|---|---|---|
| 7,010,303 B2* | 3/2006 | Lewis et al. | 455/445 |
| 7,165,109 B2* | 1/2007 | Chiloyan et al. | 709/227 |
| 7,233,994 B1 | 6/2007 | Koga et al. | |
| 2001/0047441 A1* | 11/2001 | Robertson | 710/65 |
| 2002/0075812 A1* | 6/2002 | Corwin | 370/254 |
| 2002/0159419 A1* | 10/2002 | Morris | 370/338 |
| 2003/0035397 A1* | 2/2003 | Haller et al. | 370/338 |
| 2004/0221081 A1* | 11/2004 | Yao et al. | 710/302 |

FOREIGN PATENT DOCUMENTS

| | | |
|---|---|---|
| DE | 101 03 743 | 8/2001 |
| EP | 99117872.4 | 9/1999 |
| EP | 1 028 561 A1 | 8/2000 |
| EP | 1 156 637 A1 | 11/2001 |
| EP | 1 223 722 A2 | 7/2002 |
| GB | 0002050.3 | 1/2000 |
| GB | 2 367 216 A | 3/2002 |
| GB | 2 378 217 A | 3/2002 |
| JP | 07-191835 | 7/1995 |
| JP | 2001-136229 | 5/2001 |
| JP | 2001-160829 | 6/2001 |
| WO | WO 98/21862 | 5/1998 |
| WO | WO 01/05078 | 1/2001 |
| WO | WO 01 42894 A1 | 6/2001 |
| WO | WO 01/50783 A2 | 7/2001 |
| WO | WO 01/90853 A2 | 11/2001 |
| WO | WO 02/052798 A2 | 7/2002 |
| WO | WO 03/017705 A1 | 2/2003 |

OTHER PUBLICATIONS

Software Router for Handhelds—Posted under PPC Software by Singapaq on Wednesday, Jul. 4, 2001—2 pages.
Makesure Services Ltd., 2000—Software DsLink—3 pages.
My Communicator—m-Router—3 pages.
Intuwave Products—m-Router Brocure—4 pages.
m-Router Beta Web Site—3 pages.
Examination Report, dated Mar. 10, 2008, in corresponding Japanese Application No. 2003-524193.
"KVM-Interest Archives," http://archives.java.sun.com/cgi-bin/wa?A2=ind0107&L=kvm-interest&D=0&P=41824, printed Oct. 9, 2008.
"m-Router by Intuwave," http://my-symbian.com/s80/software/applications.php?faq=17&fldAuto=119, printed Oct. 9, 2008.
"Beta Testers Required—IP connectivity solution," http://www.psionplace.com/boards/Announcements/messages/281.html, printed Oct. 9, 2008.
Blunk, L., et al.; "PPP Extensible Authentication Protocol (EAP)"; Network Working Group; Request for Comments: 2284; Mar. 1998; 15 pages.
Callaghan, B., et al.; "NFS Version 3 Protocol Specification"; Network King Group; Request for Comments 1813; Jun. 1995; 126 pages.
Casner, S., et al.; "Compressing IP/UDP/RTP Headers for Low-Speed Serial Links"; Network Working Group; Request for Comments: 2508; Feb. 1999; 24 pages.
Information Sciences Institute; "Internet Protocol DARPA Internet Program Protocol Specification"; Request for Comments: 791; Sep. 1981; 49 pages.
Information Sciences Institute; "Transmission Control Protocol DARPA Internet Program Protocol Specification"; Request for Comments: 793; Sep. 1981; 89 pages.
Jacobson, V.; "Compressing TCP/IP Headers for Low-Speed Serial Links"; Network Working Group; Request for Comments: 1144; 48 pages.
McGregor, G.; "The PPP Internet Protocol Control Protocol (IPCP)"; Network Working Group; Request for Comments: 1332; May 1992; 12 pages.
Mogul, J., et al.; "Internet Standard Subnetting Procedure"; Network Working Group; Request for Comments: 950; Aug. 1985; 17 pages.
Pall, G.; "Microsoft Point-To-Point Compression (MPPC) Protocol"; Network Working Group; Request for Comments: 2118; Mar. 1997; 9 pages.
Perkins, D., et al.; "The Point-to-Point Protocol (PPP) Initial Configuration Options"; Network Working Group; Request for Comments: 1172; Jul. 1990; 40 pages.
Postel, J.; "Internet Control Message Protocol DARPA Internet Program Protocol Specification"; Network Working Group; Request for Comments: 792; Sep. 1981; 21 pages.
Postel, J.; User Datagram Protocol; Network Working Group; Request for Comments: 768; Aug. 1980; 3 pages.
Rand, D.; The PPP Compression Control Protocol (CCP); Network Working Group; Request for Comments: 1962; Jun. 1996; 9 pages.
Reynolds, J., et al.; "Assigned Numbers"; Network Working Group; Request for Comments: 1700; Oct. 1994; 230 pages.
Simpson, W.; "PPP Challenge Handshake Authentication Protocol (CHAP)"; Network Working Group; Request for Comments: 1994; Aug. 1996; 13 pages.
Simpson, W.; "PPP LCP Extensions"; Network Working Group; Request for Comments: 1570; Jan. 1994; 19 pages.
Simpson, W.; "PPP Vendor Extensions"; Network Working Group; Request for Comments: 2153; May 1997; 8 pages.
Simpson, W.; "The Point-to-Point Protocol (PPP)"; Network Working Group; Request for Comments: 1661; Jul. 1994; 54 pages.
Simpson, W.; "The Point-to-Point Protocol (PPP) for the Transmission of Multi-protocol Datagrams over Point-to-Point Links"; Network Working Group; Request for Comments: 1331; May 1992; 69 pages.
Van Der Zijden, Thomas F., "How to connect your Psion with Mocha to the Internet?"; © Dec. 2000; Retrieved from the Internet <URL: http://home.wanadoo.nl/thomas.vanderzijden/reviews/mocha/mocha.html; 5 pages.
Yuan, Michael Juntao; Nokia Smartphone Hacks; O'Reilly Media, Inc.; Sebastopol, CA; US; Jul. 2005; 3 pages.
Zorn, G., et al.; "Microsoft PPP CHAP Extensions"; Network Working Group; Request for Comments: 2433; Oct. 1998; 20 pages.
Search Report for Great Britain Application No. 0219900.8, dated Sep. 27, 2002; 2 pages.
Search Report for International Application No. PCT/GB02/03923, completed Feb. 28, 2003; 3 pages.
The Concise Oxford Dictionary; Oxford University Press; 1990; New York; US; 3 pages.
Melling, M., *The Vital Link: Device Desktop Connectivity for the Wireless Future*, Intuwave Ltd., Version: 1.2 (Mar. 22, 2001) 10 pages.

\* cited by examiner

DATA PACKET ROUTER FOR A MOBILE COMMUNICATION DEVICE

CROSS REFERENCE TO RELATED APPLICATIONS

This application claims the priority of PCT Application No. PCT/GB02/03923 filed on Aug. 27, 2002, and British Application GB 0120686.1 filed on Aug. 24, 2001, the contents of which are hereby incorporated by reference.

BACKGROUND TO THE INVENTION

1. Field of the Invention

This invention relates to a data packet router for a mobile communication device. A data packet router is hardware or software which routes data packets (e.g. IP packets) to a device with a specific address. A mobile computing device includes without limitation handheld computers, laptop computers, mobile telephones, personal organisers and wireless information devices.

2. Description of the Prior Art

Mobile communication devices typically connect to WANs (such as the internet) in one of two ways. First, some devices are able to connect to the internet over the PSTN using an internal modem. For example, a laptop computer may have an internal modem allowing it to access the internet over the PSTN. This approach to accessing the internet has several disadvantages—(i) it requires the user to locate a spare telephone socket for a telephone jack leading from the laptop and (ii) the internal modem adds cost. The second approach is to use any long-range wireless communication capabilities (e.g. GSM or UMTS etc.) that the device itself may posses to reach a gateway (e.g. a WAP gateway) which is connected to the internet. However, using a wireless bearer such as GSM may be unreliable and slow. High bandwidth systems such as UMTS are likely to be costly.

There has also been much speculation about allowing mobile communication devices to access a wired gateway or access point to the internet so that, when in range of such a gateway, they can take advantage of the lower data access costs, high bandwidth and reliability of wired networks. For example, it has been suggested that a GSM or UMTS mobile telephone might also be enabled with a short range wireless capability, such as Bluetooth™, so that when it came into range of an access point (a Bluetooth "pod") connected by wire to the internet, it could preferentially connect to the internet via the Bluetooth pod as opposed to using a GSM WAP connection. When out of range, it would revert to the conventional GSM WAP approach. Similarly, it is also possible for 802.11 enabled mobile communication devices to dial into a 802.11 access point for a LAN; the access point is typically a stand alone unit comprising a radio transceiver; it may itself be directly wire connected to the internet, or may be connected to a PC which is wire connected to the internet. The 802.11 enabled mobile communication device can then access the internet via the access point. But this approach requires additional infrastructure investment in new hardware access points and hence fails to filly exploit, at low cost, the existing PC based infrastructure that exists in most organisations.

Conventional PCs can connect to WANs such as the internet either by directly dialing out over a PSTN land line via an internal or external modem or connecting to a server over a LAN which in turn can either dial out over a PSTN land line using a modem or is permanently connected over a dedicated line. Many businesses have spent considerable sums in developing LANs and server gateways to the internet and these are now commonplace parts of a computer or communications infrastructure. Using this infrastructure to allow mobile communication devices to access the internet is a compelling concept. The prior art suggests that it is possible for a mobile communication device to access the internet via a PC itself connected to the internet (e.g. directly or via a server)—i.e. to use the ubiquitous PC itself as the access point. Reference may for example be made to WO 01/90853 and EP 1028560. However, these disclosures provide few details on how to actually implement such a system.

It is also possible for remote PCs to dial into a server over a PSTN connection using Microsoft Remote Access Server (RAS). But this in essence amounts to allowing an external device to look into an organisation's computer infrastructure, as opposed to using that existing infrastructure to enable a wireless computing device to look outside to the internet via RAS. In theory, RAS can be used to allow a mobile computing device to access the internet via a PC running RAS, but it is difficult to configure and inflexible.

SUMMARY OF THE INVENTION

In a first aspect of the invention, there is a data packet router which can run on a computer connected to a WAN and which enables a mobile communication device to access the WAN via the computer, wherein the router comprises (a) bearer plug-in modules which each enable connection between the mobile communication device and the computer over a different bearer and (b) a bearer discovery module that can dramatically and automatically recognise when an instance of a new bearer (relating to an installed bearer plug-in module) is attached to the computer when an end-user upgrades the computer and can make that bearer available.

Hence, the present invention envisages, in one implementation, using a computer such as a PC as an internet access point for mobile communication devices. A mobile telephone could gain web access using conventional WAP or, with the present invention, it could also be connected to a PC and access the internet through the PC using the most convenient bearer available using an appropriate bearer plug-in module.

The bearer plug-in modules may each enable connection over one of the following bearers:
(i) direct cable via serial COM port;
(ii) USB;
(iii) IR;
(iv) short range wireless.

Plug-in modules for other kinds of bearer can also be deployed; the above list is non-exhaustive but represents the most common bearer types at this time. The router may comprise an extensible bearer abstraction layer capable of being augmented with new bearer abstraction code for new bearers. For example, a bearer abstraction layer may be included in each bearer plug-in module. These modules may therefore constitute an extensible bearer abstraction layer.

Because the router uses bearer plug-in modules, it is possible to write new bearer modules as and when new bearers are developed and to readily add them to upgrade existing implementations. This is valuable since new connectivity standards (and enhancements to old standards) are continually under development. As an example, enhanced USB has recently been developed, as has Firewire. Bearer plug-ins for each of these can be written and deployed to upgrade existing implementations.

An additional feature is that there is a bearer discovery module that can dynamically and automatically recognise when an instance of a new bearer (relating to an installed bearer plug-in module) is attached to a computer and can make it available. No user configuration is then needed at all, unlike conventional systems, such RAS. Bearer discovery module may be specific to a given bearer type.

The router may use a serial data link protocol such PPP as a local link protocol to encapsulate data passing over the connection between the mobile communication device and the computer so that the bearer is treated as a serial data bearer. The router also comprises a dynamic protocol plug-in which enables connection between the mobile communication device an the computer over a TCP/IP connection protocol. Hence, data routed by the router may be IP packets carrying data and/or voice. Low cost VoIP is therefore possible with an implementation of the present invention—a mobile telephone could use relatively costly UMTS for voice when no PC with a router as described above was available, but could also connect to such a PC for lower cost VoIP.

The router may further comprise protocol plug-ins which each enable connection between the mobile communication device and the computer over one of the following protocols:
(i) EPOC PLP; (ii) UDP/IP.

In one implementation, no software specific to the router needs to be loaded onto or be running on the mobile computing device. Hence, the router function can be run solely from a diskette, CD or other removable media running on the PC without requiring any software installation on the mobile computing device or third party dependencies in order to execute. Further, the PC itself does not need to know any information about the mobile communication device to enable access from the mobile communication device to the PC.

The router can operate by causing one or more serial ports on the PC to open as a modem and the router operates as a proxy for the mobile computing device connected to the PC. The router can assign temporary non-routable virtual IP address to several locally connected mobile communication devices. The router is able to intercept all incoming data packets for a given channel and then forward the data packets to the correct locally connected device associated with that channel.

The router may also comprise a plug-in module for each different host/locally connectable mobile communication device.

The PC may also be connected to a LAN such that the router enables the mobile communication device to access the LAN via the PC.

Some use cases for the present invention are:
(a) browsing the internet from a browser running on the mobile computing device, with the internet connection routing through the computer;
(b) synchronising contacts and diary entries between the mobile computing device and the computer;
(c) backing up data on the mobile computing device onto an internet based back up server or onto the computer,
(d) browsing data on the mobile computing device from the computer and directly using that data in an application on the computer,
(e) writing a message on a messaging application on the computer and sending that message from the mobile computing device.

The present invention therefore leverages the existing PC based internet communications infrastructure that already exists in most organisations, allows the mobile phone to view conventional web pages using a micro-browser (i.e. it is no longer limited to the relatively small number of WAP enabled sites, which in any event currently offer limited content) and means that wireless network charges are not incurred. For mobile professionals, being able to access the internet reliably and cheaply by using existing wire-based PC infrastructure is very useful—in many circumstances, one has easy access to someone else's PC, but one wishes to use ones' own wireless device to browse and perhaps store data. This is now possible with the present invention. Further, the present invention allows a combination of a user's mobile computing device and ordinary computer (e.g. desktop PC) to be operated as a single, seamless device, sharing facilities and capabilities.

In a second aspect, there is a method of enabling a mobile computer device to access a WAN using a data packet router forming a part of a computer connected to the WAN, comprising the step of selecting a bearer plug-in module to enable connection between the mobile communication device and the computer over a desired bearer.

In a third aspect, there is computer software when stored on a carrier medium, the software enabling a data packet router to perform the above method when tuning on the computer.

In a fourth aspect, there is computer software when transmitted over a network, the software enabling a data packet router to perform the above method when running on the computer.

In a final aspect, there is a computer comprising a router as defined in the first aspect.

BRIEF DESCRIPTION OF THE DRAWINGS

The present invention will be described with reference to the accompanying Figures, in which.

DETAILED DESCRIPTION OF THE PREFERRED IMPLEMENTATION

During the course of this description, like numbers will be used to identify like elements according to the different views that illustrate the invention.

The present invention is implemented as the m-Router™ software based router product from Intuwave of London, United Kingdom. m-Router provides mobile computing devices with TCP/IP & UDP connections via direct wired or wireless links to a host PC. It consists of software which runs only on the host PC. No changes or additions are required to software installed on the attached devices.

m-Router is an easy to use, standards based PC implementation of a firewall and PPP server that is used to enable mobile devices to access the host PC and if reachable the internet/network to which the PC is connected. By using PPP as the local link protocol between a mobile device and the PC, connectivity based solutions for these devices can be reused for both over the air and desktop based scenarios. By providing bearer plug-ins (an extensible hardware abstraction layer) and protocol plug-ins (a configurable protocol stack layer) bearers such as USB and Bluetooth can be used where previously connectivity was either solely RS232 based, or was different for each bearer. The solution provided by m-Router allows all hardware bearers to be treated with equality and therefore eases the development effort as generally only one protocol—TCP/IP—needs to be understood by the developer. Since one of the main paradigms in m-Router is automatic configuration and transparency for the consumer, this delivers the advantages of standards based connectivity software but in a manner that is not restricted to experienced system mangers.

M-Router is currently offered in two versions, m-Router Runtime and m-Router Developer.

m-Router Runtime

Figure 1:
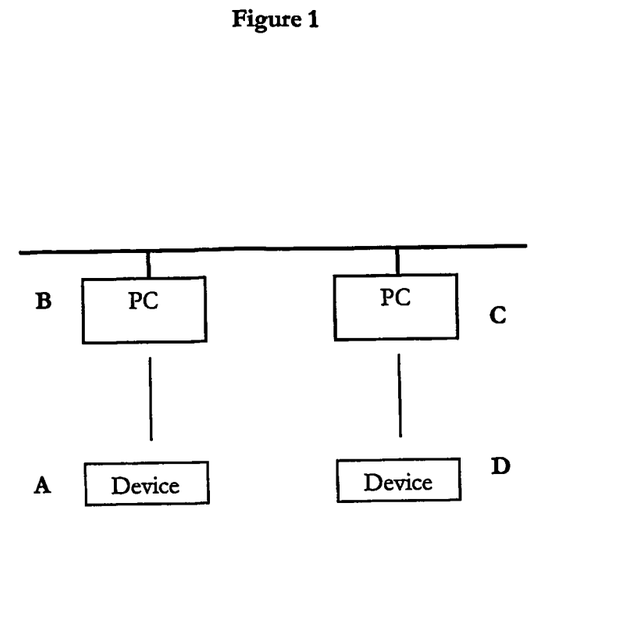
FIG. 1 is a schematic overview of how an implementation called m-Router™ allows mobile computing device to connect to PCs and to other mobile computing devices

This version of m-Router allows Symbian OS devices attached via a serial cable to a PC to access the network/Internet via the host PC using TCP/IP over PPP. m-Router does not require RAS (Remote Access Service) or other Windows components to provide any of its functionality. It is a UI-less shared server. The program provides 2 main functions:

Attached mobile computing devices can use their native Web browsers and email programs to connect to the Internet via the PC which host m-Router.
   Attached devices can access an http server on the host PC without knowing its IP address. A standard web address (http://wsockhost,mrouter/ . . . ?) is used to access files on the host PC.
   No configuration option are provided.

m-Router Developer m-Router Developer provides additional functionality to m-Router Runtime. It is configurable through a user interface. The functionality allows a browser on a device (A in FIG. 1) or a PC (B) to access an HTTP server on a device (D) via its host PC (C), where m-Router connects A to B and C to D. The HTTP server on device D is called m-Surf and is described in Appendix 1.

This version also contains a user interface, which allows the following parameters to be set
   Listening port number
   Log file name and directory
   Enable/disable COM ports
   Enter software registration number The interface also allows various parameters to be displayed while the software is running.

Figure 2:
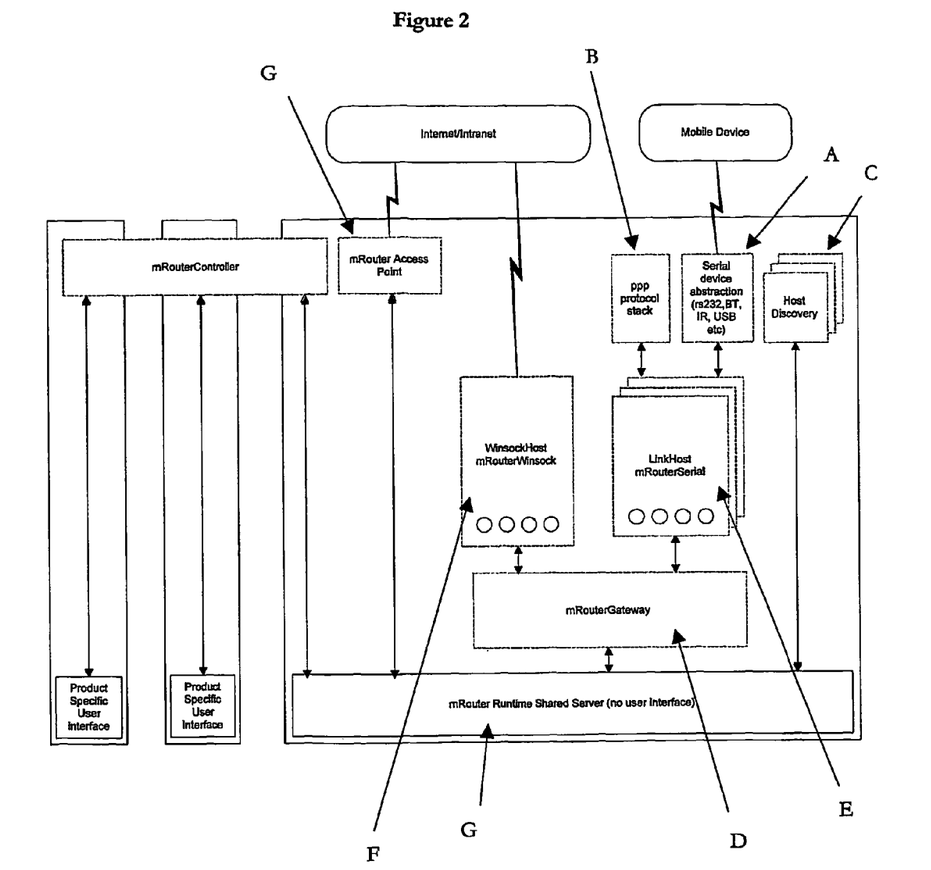
FIG. 2 is an overview of the m-Router components.

In more detail, m-Router is a moderately complex collection of sub systems. FIG. 2 is an overview of how these sub systems interrelate.

One or more products may include/use m-Router. These all share a single instance of a shared runtime (m-RouterRuntime.exe) that exposes its state and allows manipulation via a shared memory component called m-RouterController.

Within m-RouterRuntime G a set of host discovery modules C are loaded. These all expose a common interface and are extendable. These modules monitor for new pieces of hardware becoming available/unavailable, such as for example a relevant USB device being inserted, a Bluetooth serial port being added/removed. When a change is detected they notify m-RouterRuntime G via a call-back interface and they are then asked to enumerate the hardware bearer devices 'currently available'. These are defined by bearer plug-ins A, which each define an available hardware bearer (e.g. USB, direct cable, IR, Bluetooth etc.) The plug-ins act as serial device abstraction layers.

MRouterGateway D manages a internal set of imaginary hosts (sometimes referred to as host handlers). Each of these hosts has a non-routable IP address associated with it. Most of these hosts are created at the request of m-RouterRuntime in response to changes in the list of 'currently available' hardware bearers A. A class called LinkHost E (contained within m-RouterSerial module) implements these hosts. Instances of this class use additional modules that abstract the various hardware bearers A as serial data streams. They read and write raw data bytes from connected devices and use a PPP stack B to convert the assumed PPP data to an internal sequence of packets/frames. There is a single instance of a host called Winsock Host F that interfaces with the PCs TCP sockets framework. Frames of data are passed around the system by m-RouterGateway D, between source and destination endpoints specified in the frames. All the various hosts internally manage endpoints for these frames. These end points are called port handlers. In Winsock Host F, these ports (shown as grey circles) correspond to socket connections on the pc (possibly to other machines on the internet or alternatively to applications on the same PC as m-Router). In the Link Hosts E these ports correspond to sockets on the connected mobile device and the contents of frames to and from the remote ports are transferred via PPP over the abstracted hardware bearer.

Various statistics regarding the current available hosts are 'published' via m-RouterController so that external user interface components can display wiggly links, check boxes and other forms of feedback to the user if desired. Other statistics are made available for internal use to m-RouterRuntime, which in developer configurations can load m-RouterPropPages.dll to display byte level diagnostic logging.

Mobile devices connect through m-Router to the PC and any network it is connected to. Additionally mobile devices can choose to connect via TCP to a service called m-RouterAccessPoint G. If they choose to do this then they pass a series of properties to m-RouterAccessPoint G and are considered to have logged in. m-RouterAccessPoint G exposes a programming API to enumerate connected devices and their associated properties. MRouterAccessPoint G also allows programmatic creation of routes to ports on connected mobile devices. These devices being part of the non-routable network implemented by m-Router would otherwise be unreachable by the PC. m-RouterAccesspoint G can create local PC socket listeners that will forward data to a target port on a selected device.

MRouterWinsock F acts as the interface between the sockets API on the PC and hosts and ports internal to m-Router. It performs simple network address translation and therefore behaves as a simple firewall. MRouterAccessPoint G allows programmatic access to devices hidden behind this wall.

The following section gives a more detailed explanation of how the m-Router system works, and the objects that need to be implemented by additional modules.

Host, Ports, Streams, Frames, Addresses and Ports.

Figure 3:
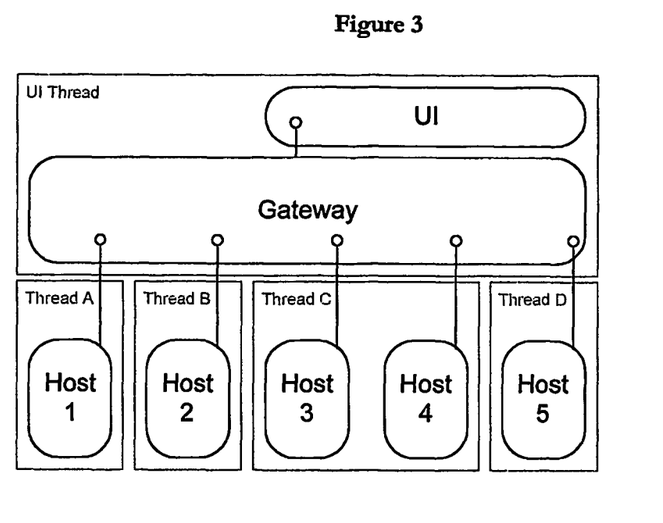
FIG. 3 is a schematic of the system/host structure.

The m-Router system manages an imaginary network of imaginary machines known as 'hosts'. Each host is assigned a 32 bit identifier that is its 'address'. All hosts must implement the interface for a m-RouterHostHandler. To load a host the runtime user interface calls the LoadHost function on the system object, passing in the CLSID of the COM object that is to be loaded, the address to assign to that host, and an initialisation string that will be passed to the host after it has been loaded. Since some hosts may 'block' as they are used, the LoadHost function also allows a thread to be specified for that host it live/run in. It is possible for all hosts to live in the same thread or in separate threads as shown below. Also note that multiple instances of a host may be loaded (provided they are assigned a unique address). For example as shown later several instances of a host (specified by a CLSID) may be loaded each to look after a single different comport. FIG. 3 is a schematic of the system/host structure. The 'Gateway' corresponds to the m-Router system; we will refer to this as the 'system'.

Figure 4:
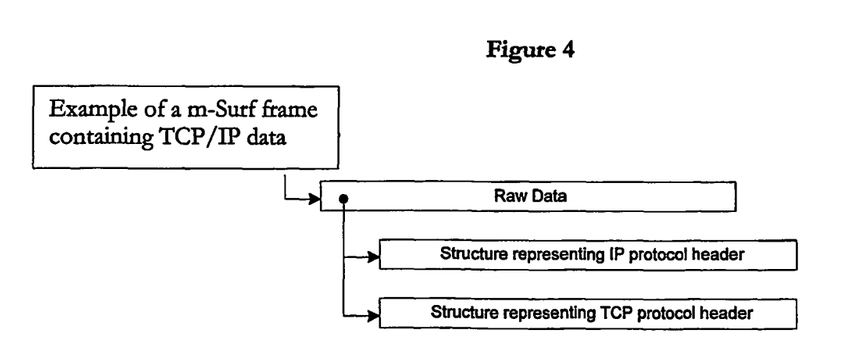
FIG. 4 shows how a TCP/IP frame can be packaged by m-Router.

Data is passed between hosts via the system. The data is wrapped up in m-RouterFrames. An m-RouterFrame is a COM Object that represents a series of bytes. The COM object provides functions to append to the contents and to obtain a pointer directly to the contents of the frame. While this limits m-RouterFrame to "in-process" use, it does give a performance benefit in speed and memory. Usually the data passed between hosts has additional data associated with it in one or more headers. The m-RouterFrame object supports this header data by allowing other m-RouterFrame objects to be attached to the main object as children. In effect this means an m-RouterFrame is a tree where each node can contain a sequence of raw bytes. Each child is identified by a 32-bit value. For example a TCP/IP frame could be packaged as shown in FIG. 4. The m-Router Frame does not dictate what headers/data etc should be used. Such an agreement should exist between the sender and receiving host objects. All m-Router does is sequentially deliver the frame from one host to another host (or if desired back to the original host).

Hosts create one or more m-RouterPortHandlers to send and receive these frames. Each port is assigned a 16-bit identifier unique within the domain of the host that created it.

Figure 5:
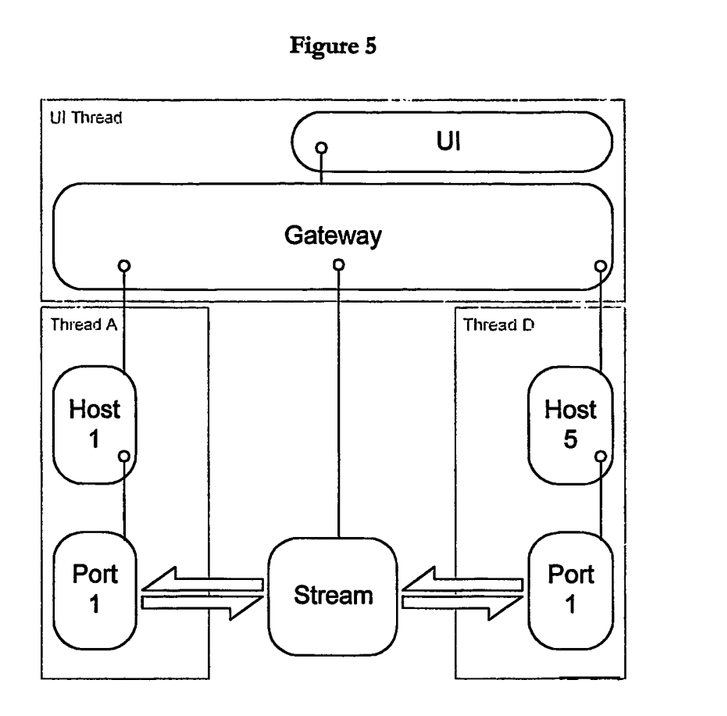
FIG. 5 shows how the system organizes the frames that it transfers into discreet streams.

To summarize frames are passed between m-RouterPortHandlers created by m-RouterHostHandler, and the m-RouterGateway buffers and routes these frames from source port to destination port. The system organizes the frames that it transfers into discreet streams. Each stream object has a unique id, and 2 associated port objects. The stream has no understanding of the content of the frames; it merely passes them to the target port. FIG. 5 illustrates this.
Sites, Logging, Namespaces, Monitors.

The system provides additional services that can be accessed from the driving user interface, and from the hosts and ports. Each host and port when initialised is passed a SiteObject that can be used to send frames or obtain helper objects provided by the system. This allows the hosts and port to make request of the system while hiding the full functionality exposed to the user interface. This means that an errant host or port cannot directly access another host or port except under the control of the system.

The first such helper service provided by the site object is logging. An m-RouterLogger object can be used to append textual information. The nature of the information is up to the object using the logger. Additionally 32 bit counters can be set. These counters are accessed by Id and some common ids are predefined they are. The logger object can also be used to hold blob data. For example the winsock host mentioned later maintains a list of listeners. The user interface can request the logger assigned to a specific host etc and query the contents of the text buffer, the counters and any of the blobs. The text placed in a logger object can additionally be logged to a text file for later diagnostic perusal.

To minimize the assumptions a host or port has to make about other modules, the system provides a namespace where named data can be stored and queried as small shared dynamic dictionary of addresses, services etc. The TCP modules mentioned later use this dictionary to convert names such as www.intuwave.com into 32 bit Internet addresses. Finally to avoid the UI or other hosts/ports polling logging objects and namespace objects for changes, both type of object allows client provided Monitor objects to be registered and called back when something changes. This allows the user interface to respond to state changes and update its display when changes occur. The monitoring, logging and namespace services look after interthread issues internally so that this is not a problem for the typical application and can be ignored safely.
Protocol Recognisers, Stream Monitors, PortObjects, m-RouteGateway does not enforce any rules on the contents of frames but needs to extract source and destination for a given frame in order to assign it to the correct stream. To do this m-Router uses ProtocolRecognizers that extract protocol/source/destination information from a frame. This allows protocol support to be added and removed from the system by the user interface calling the appropriate functions on the system interface. Once the 'stream details' have been extracted from a fame the details are either matched against an existing stream or a new stream is created. When a new stream is created the appropriate hosts are used to create port handlers for that stream. In order to allow protocol specific logging, protocol recognisers are used to create stream Monitors that are passed each frame sent through a stream before it is sent to its destination port. This monitor stream object can access the logger object for the stream and so can provide hex dumps of frames and counts of byte in/out. The stream monitor can also determine when a stream is closed either through a watchdog timer or by watching for termination frames if appropriate to the protocol.

Finally in order to reuse code, m-Router uses objects called PortObjects. Protocol modules provide default implementations of Port Handlers for the protocols they support these then use the much simpler PortObject interface. This avoids each host from having to implement similar protocol specific code as it only need provide a simple port object, and need not be aware of the inner workings of the protocol it is using.

Figure 6:
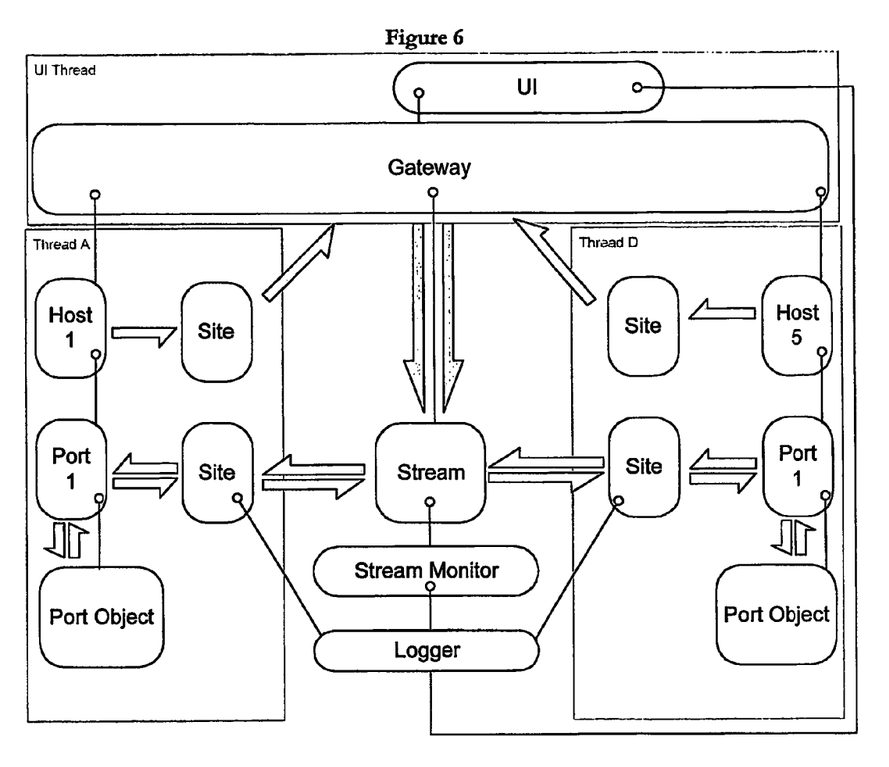
FIG. 6 shows a simplified structure for a single stream.

The simplified structure for a single stream is shown in FIG. 6.
Link Host—m-RouterSerial.dll Some handheld devices attach to other computers using serial cables. These use protocol stacks to convert frames into serial data and then transmit this data back and forth. Examples of such protocols are PPP and PLP. The m-RouterSerial module implements a m-RouterHostHandler that supports such devices. Multiple instances of this host can be loaded by the system one for each serial port that is to be supported.
Serial Device Abstraction Layer The data is read and written to the hardware via a COM object called a SerialDevice. This allows other SerialDevice interfaces to be written if needed. For example the m-Router-Emulator dll implements a SerialDevice that talked directly to a DLL running inside either an ER5 or Quartz Symbian OS emulator via a memory buffer. This simulates a serial connection without the need for a physical cable. The Standard SerialDevice implemented and used by default in the m-RouterSerial module:

Talks to the serial ports COMx as exposed by WIN32. This means that IR and blue tooth should be supported transparently.

Allows the DSR/DTR lines to be used to detect a device connection/disconnection     Supports CTS/RTS handshaking though this is not enforced or required.

Uses a worker thread and a circular buffer of input and output queues for maximum efficiency.

Mimics a modem so that devices can believe there are in fact dialing an ISP via a modem when in reality they are connected to a serial port handled by m-RouterSerial.

The m-RouterSerial Host maintains counts of bytes read/written and the state of the connection all of which are exposed via counters on the appropriate m-RouterLogger object. The state of the host, the serial port to use and the baud rate can all be configured by the driving user interface. This is achieved by sending command strings to the host using the system function SendStringToHost. For example the strings below represent a subset of the existing commands that can be sent to the serial host.

"ENABLE;"
"DISABILE;"
"CONNECT;"
"DEVICECLSID={DB701106-BB66-11D4-941D-00104B45013A}"
"BAUD=115200"

Protocol Stacks

Once the data has been read from the serial device it is passed to one of more protocol stacks to handle. The protocol stacks are loaded as COM interfaces into the serial module as determined by the user interface. The protocol stacks read the data sent to them and may do zero or more of the following
  Pass response data back to the Serial Host to queue to the Serial Device
  Change the state of the serial host notifying it that a logical connection has been negotiated or terminated
  Pass one or more m-RouterFrame objects to the serial host to pass to the system for routing to other hosts.

In this way support for serial protocols can be added and removed independently of the serial host and serial device

SUMMARY

Figure 7:
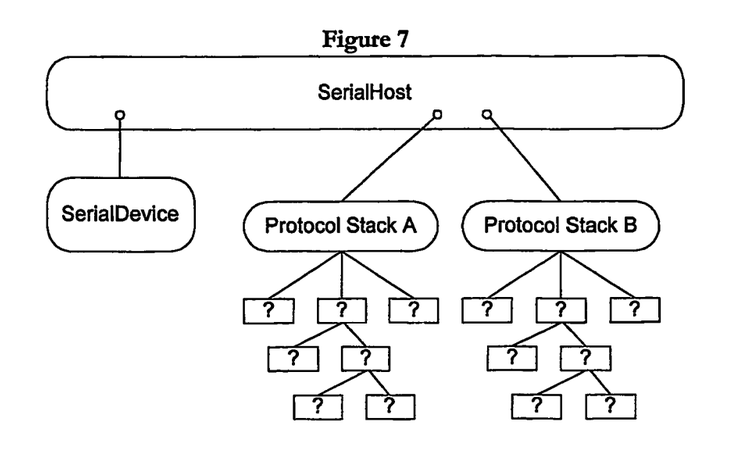
FIG. 7 shows the protocol stacks.

A schematic summary is provided at FIG. 7.
TCP/UDP/IP Support—m-RouterTCP.dll This module provides a variety of interfaces which can be loaded into various parts of m-Router to provide tcp/ip/udp support

REFERENCES

The following RFCs may be helpful background to read if wishing to understand the details for this module.

| RFC1661 | RFC1172 | RFC1331 | RFC1332 | RFC1570 |
| RFC1144 | RFC1700 | RFC1994 | RFC791 | RFC792 |
| RFC793 | RFC950 | RFC1813 | RFC1962 | RFC768 |
| RFC2118 | RFC2153 | RFC2284 | RFC2433 | RFC2508 |

Recogniser, Stream Monitors and Port Handlers

The m-RouterTcp module provides a protocol recogniser that recognises and extracts routing information from the m-RouterFrame objects where there is are 'child/header' m-RouterFrames for IP headers and either TCP or UDP headers.

It provides stream monitors to log the byte content of these frames to the appropriate logger object. These loggers also attempt to track the state of each connection. The TCP monitor does this by watching the 'flags' in the TCP headers exchanged while the UDP monitor merely maintains a watchdog timer to determine when the connection is no longer being used.

Since TCP in particular uses a nontrivial handshake and acknowledge mechanism this module also provides objects that can be used to implement PortHandlers in other hosts and modules. For example the DNS host and winsock hosts use these objects. These objects encapsulate buffering and protocol housekeeping but delegate the actual raw data handling to other client provided objects.

PPP Stack

Figure 8:
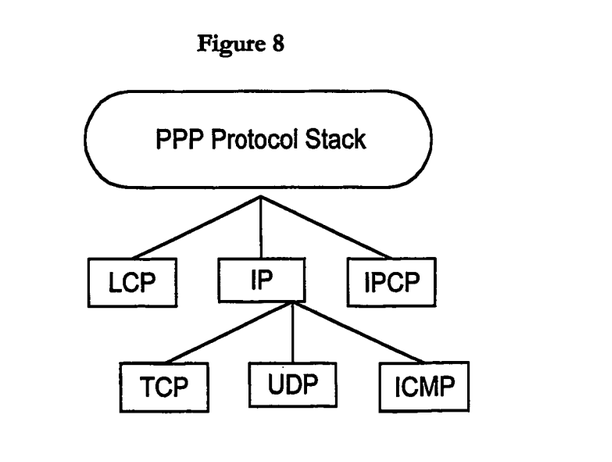
FIG. 8 shows the PPP stack.

The module also provides a protocol stack which can be loaded by the Serial Module previously mentioned. This stack supports basic connection management with LCP and IPCP. It also decodes IP/TCP/UDP packets, which it converts into m-RouterFrames. These frames may later be handled by the protocol recogniser, the stream monitor and helper port handlers already mentioned. It also converts m-RouterFrames back into packets suitable for transmition over the serial cable. This module support Van-Jacobs compression but does not as yet support authentication. FIG. 8 is a schematic representation.

DNS—Name Server Hosts

TCP/UDP client applications typically need to convert names addresses such as www.intuwave.com into 32 bit internet addresses such as 123.45.67.89. To do this a standard exists for servers known as Domain Name Service (DNS). The m-RouterTCP module provides a m-RouterHostHandler implementation that provides a subset of this standard such that devices can ask for name lookups. These hosts use the namespace of the system. At initialisation this is typically seeded with values for the m-Router internal addresses. If a request is made for an unknown address (one that is not already known) then the DNS hosts pass requests to other parts of the system for further help. In the typical configuration a command string is sent to the winsock module described later. Once this has performed the lookup and knows the answer it places the information in the system namespace. The DNS hosts monitor changes to this namespace and can then respond to any outstanding queries with the correct answer. Typically DNS queries are made by UDP however it is possible for a query to be made via a TCP connection and the DNS hosts support both mechanisms. To do this they use the PortHandler Objects mentioned above.

Winsock Support—m-RouterWinsock

The mWinsock Module allows m-Router hosts and devices connected to them to communicate with other REAL internet devices by piggybacking the internet connection of the pc which m-Router is running on. It is separate from the TCP module since theoretically if the pc hosting m-Router does not have an Internet connection it would still be possible to run m-Router WITHOUT the winsock module loaded.

Address Translation

Internally m-Router as already mentioned implements a network of logical hosts. Each host is assigned a 32 bit address, however in the real Internet such addresses have to be carefully assigned and controlled to avoid routing problems. Also a PC typically only has one of these 'REAL' addresses. To get around these 2 problems the m-RouterWinsock module of m-Router makes connections on behalf of internal hosts. For example assuming the winsock module has address www and a device on Host DDD is wishing to talk to a REAL Internet address AAA the following happens. Also assume the PC that m-Router is running on has a real address of BBB
  The host at DDD constructs a frame for AAA from DDD
  The m-RouterFrame is routed by the system from host DDD to winsock host WWW. (the system is configured with default routing information)

The winsock module looks at the headers in the frame and creates a win32 based connection to AAA and sends the data in the frame (not the headers)

Real machine at AAA receives the data from the PC with the REAL address BBB.

Real machine at AAA sends back the data to the PC with the REAL address BBB.

The data is received by the winsock host, which then constructs an m-RouterFrame from WWW to DDD, and send this frame to the system.

The system sends the m-RouterFrame to device on Host DDD which (mistakenly) thinks it came directly from AAA.

Note that the host at AAA also doesn't know the full truth, it thinks it is talking solely to the PC at BBB (in strict truth that IS all it is doing)

This generally is satisfactory, however there is one problem with this approach. Some applications may send IP addresses or port numbers in outgoing frames to their peers which may then attempt to connect back. If in the above example device DDD was to send its address DDD to real address AAA INSIDE a frame, then real address AAA would try and respond to REAL address DDD. But real address DDD might not exist at all.

This is a problem with all firewalls that do address translation and a common solution is a protocol called 'SOCKS'.

Listeners

While the winsock module can easily do address translation for outbound connections and the responses to them, it can not automatically guess where to send unsolicited incoming connections from the internet, in fact unless it is specifically listening on the correct ports it may miss the connection entirely. To get round this problem it is possible for the driving user interface to send command strings to the winsock host instructing it to start listening on specific TCP or UDP ports and route all incoming connections to specified hosts (possibly also changing the port number too). The is even a special address "com?.m-Router" which will result in the frames being forwarding to any device on ANY connected serial port. If there are 2 devices on connected serial ports then the results are obviously undefined.

Appendix 1

Figure 9:
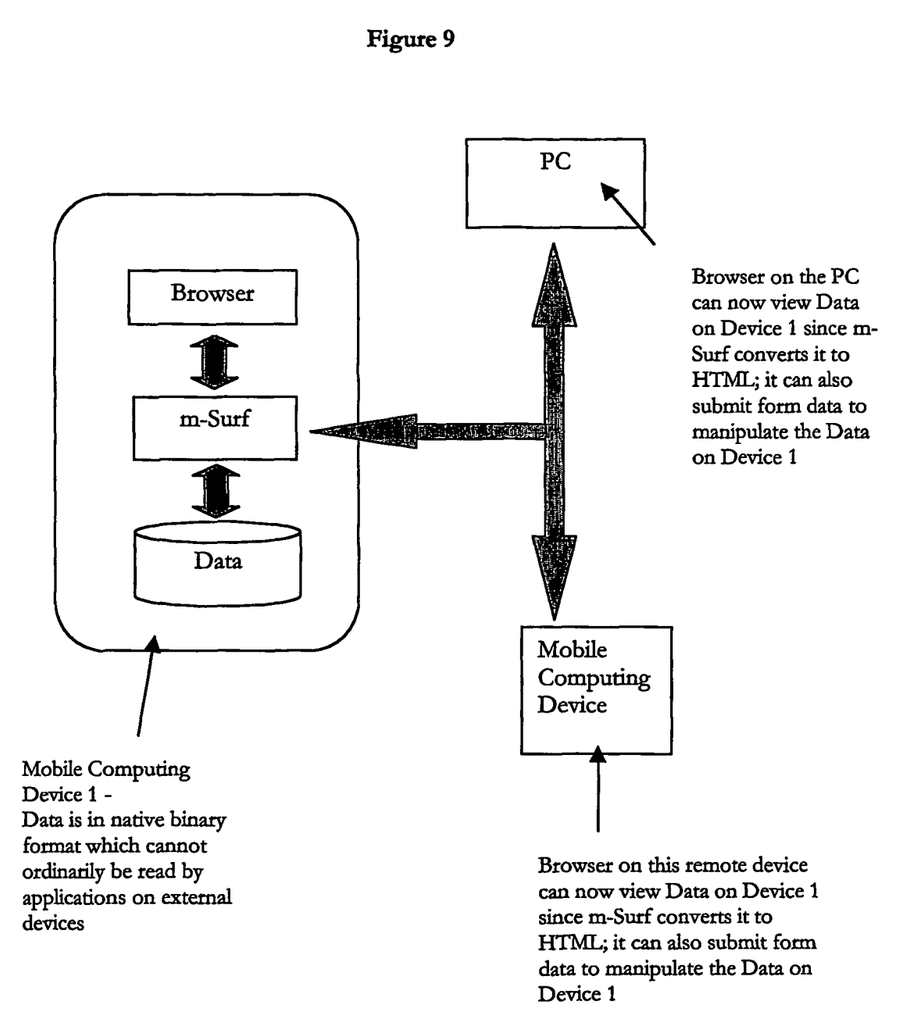
FIG. 9 shows the m-Surf HTTP web server which is used in the FIG. 1 network.

M-Surf m-Surf is a light weight HTTP server resident on a mobile computing device that can be used as a standards based means of accessing application specific data held on a mobile device, hence allowing remote viewing and manipulation of data from connected devices (e.g. other mobile computing devices, desktop PCs) that would otherwise be restricted to the device. FIG. 9 shows this schematically. It is 'standards-based' because it converts application specific data which is in one or more native proprietary binary data formats (e.g. optimised for the compact storage and low power consumption requirements of mobile computing devices) on the device (e.g. Symbian OS format, or Microsoft Pocket PC format) to a standards-based format which can be rendered by standards based applications running on the device (e.g. a web browser if the standards based format is HTML) and also by external devices connected by wire or a wireless network.

The design of mSurf 2.0 is modular and based on the idea of a pipeline of simpler plug-in modules that each perform a discrete part of the system. The modules are loaded and managed by a framework called mStream. mStream provides pipes and data sharing objects. It provides a mechanism to load and link the appropriate modules together to form a logical pipeline. This structure allows individual modules to be replaced or used in alternate systems, leading to efficient and rapid design of new systems.

The outer most component in the system is considered a gateway into this pipeline and is another reusable component that is used to provide access to various other mStream based pipelines. The inner most component is a data conversion plug-in module that is determined dynamically based on the URL and specifics of the request for application specific data passed into m-Surf. For example it may be a plug-in module that retrieves data from specific sources (i.e. restricted sub-set of the device filing system) PIM contact information, or messages, or word processed documents etc and converts them to a required standards based format or a module that calls into additional layers to perform some other application specific query. Multiple inner most modules will be present in a given system.

Figure 10:
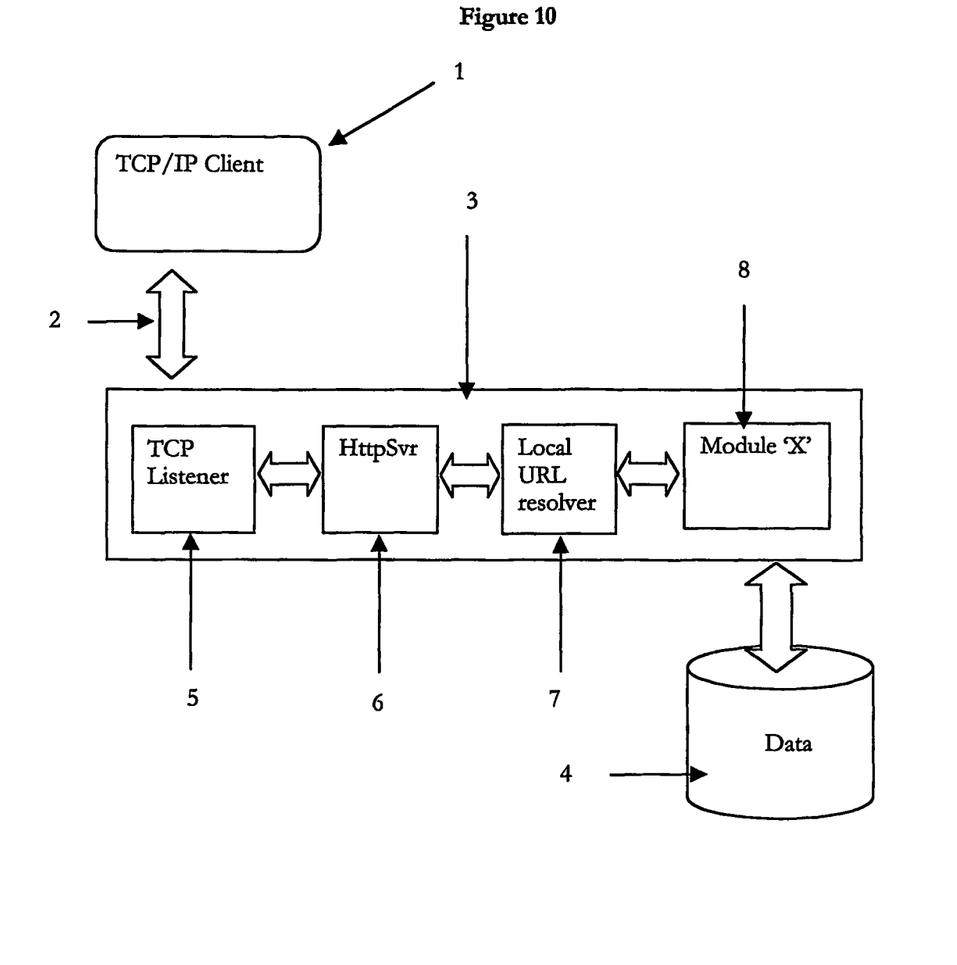
FIG. 10 shows internal details of the m-Surf http web server
Figure 11:
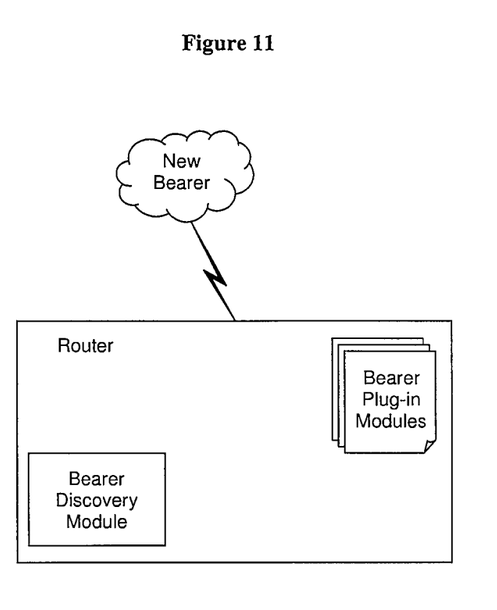
FIG. 11 illustrates an exemplary architecture for a router in accordance with the present invention.

The pipeline is shown at FIG. 10. A web browser application (the TCP/IP client) 1 sends data requests 2 defining what data it needs, the desired format etc. to the m-Surf web server indicated generally at 3. The agreed format can be explicitly requested or an implicit default selection. The m-Surf web server 3 in essence takes application specific data stored on the device in a proprietary and compact format from the relevant sources in memory 4 and converts it into the agreed format encoded using HTTP and then passes it back to the requesting component (in this case web browser 1) for processing/rendering.

Key features are that:

(a) the location of the requesting application/component 1 is not material. It can be within the device itself, or external to it. There can be multiple such components.

(b) m-Surf can output back to the requesting component data in any agreed standard format—e.g. HTML if to be rendered in a web browser, but possibly a text string for other applications etc.

(c) 'Browser application 1 can also write data to the memory 4 or alter existing data. Hence, a web browser on a device could be used to display diary information stored on the device; the user can add new calendar entries via the browser which are sent as formdata to m-Surf which then converts them into the proprietary native data format used in the device to store calendar data.

The components within m-Surf 3 are, briefly, a TcpListener 5 which listens out for incoming data requests and then passes them as a logical data stream to HttpSvr 6, which reads the incoming data requests and converts them to an internal structure which it can manipulate, encoding its output as HTTP. Local URL resolver 7 then works out to which particular Module 'X' 8 it should send the request to and ensures that it gets data back in the agreed format Module 'X' 8 then acquires the relevant data and converts it into the agreed format (e.g. HTML, text string, image file formats such as JPEG, or sound file formats such as WAV etc.). This is passed back up through m-Surf and then sent to the requesting application 1. The final path to application 1 may be external over a piconet or a WAN such as a GPRS or 3G cellular network.

The various parts of the pipeline in more detail are:

TcpListener 5—this reusable component is configured to listen on a specific TCP port (usually 80). As connections are made an object is created inside the module that reads and writes from the new connection. This object starts a new instance of the pre-selected module for this port (in this case HttpSvr.dll) and passes it a pair of pipes over which it will exchange request data. It also passes a collection (bundle) of properties which HttpSvr can use to find details about the TCP connection. The TcpListener module serves as an adapter between the external TCP bi-directional data stream and the internal pair of unidirectional pipes that are fed into HttpSvr.

HttpSvr 6—Each instance of HttpSvr reads from its input pipe and parses the possibly multiple text HTTP request into a collection (bundle) of header values and a possibly null request content stream. It then uses mStream to create an instance of LocalUrlResolver and passes it a pair of pipes and the collection of headers/merged with the collection it received from TcpListener. It passes the request content to LocalUrlResover that then returns a response content via the pipes. It formats this response into a HTTP response header and content and returns the result to TcpListener. Note that HttpSvr may parse several individual requests from a single data stream and will create a new instance of LocalUrlResolver to process each of these requests. The splitting of requests and concatenation of responses is internal to HttpSvr.

In overview, HttpSvr therefore performs the following functions:
- to parse the input stream header and convert all recognised headers into input parameters.
- to parse the input stream body and convert to a binary stream containing just that data
- to additionally convert and create additional headers with 'more useful' formats
- to read the response parameters and data from module X and format into a http request
- to log a summary of the request and result to a text log file
- to reply to the client in the protocol version of the request i.e. http 1.0/1.1
- to gracefully handle the client (i/o layer) disconnecting
- to support the trace command without recourse to the lower layers
- to allow the I/O layer to supply client address information for the request LocalUrlResolver 7—this reusable component takes as its input a collection (bundle) of headers and a possibly null request stream. It examines the URL and uses a configurable decision process as to which module it needs to pass the request to for processing. It loads the appropriate module and delegates processing to that module.

Module 'X' 8—this processes the request headers and content and returns a response. For example a module called IFileRequest is able to retrieve files from a restricted subset of the device filing system, and to dynamically generate HTML directory listings. More generally, Module X converts application specific data from a proprietary compact native data format into an agreed, standard format that can be handled/rendered by another application on the device (e.g. a web browser) or by another device.

MODULE 'X' iFileRequest functions are therefore:
- uses access control DLL to map input path to physical path and to query for permissions
- to "GET"/"PUT"/"DELETE" files where permitted by the access DLL
- to get directory listings as permitted by the access DLL and return as html pages
- to support "HEAD" verb (file modified date only) where permitted by the access DLL
- to where possible open files as read only deny none and where that failed to retry Module X is a plug in; a device will have multiple such modules and will dynamically select the appropriate module when a request for data handled by the module is received by m-Surf. Multiple modules can be active and can hence deliver data from several different data sources into a requesting application.

This also allows user interface customization separately from and in addition to raw data retrieval. For example, a web browser running on the device can request via m-Surf data from all of the different data sources that a given user (or a device supplier or network operator) might define as being desirable in a start up home page (e.g. contacts, diary, device function menu, link to operator's home page). This becomes in effect the entire graphical user interface for the device. It is straightforward to add corporate logos to the graphical user interface, allowing the device to be branded for a particular device manufacturer, network operator or corporate owner. A master template can be used to define the overall structure of the UI; this initiates multiple requests for data from several sources to build up the UI. The UI could for example consist of a user defined list of top level menu items (e.g. contacts and dairy) and could also incorporate a user defined menu hierarchy. The user interface to the device can also be dynamically changed or update or customised over the air to take into account user preferences or enable greater product differentiation.

Each of these modules 5, 6, 7, 8 can be alternatively have its input/output pipes redirected to or from test files or other sources, though typically they will be used as in the above situation.

While not specifically part of m-Surf, one extension to the system has been a simple template module that can call plug in modules and then format the returned data using template files to produce HTML and other formats of content.

By modularizing the design, alternative and related technologies such as WAP and SOAP can also be integrated in a structured yet efficient manner.

The invention claimed is:

1. An apparatus comprising a processor and a memory storing computer program code;
   wherein the apparatus is connectable to a wide area network (WAN) so as to enable a mobile communication device to access the WAN via the apparatus; and
   wherein the memory and stored computer program code are configured, with the processor, to cause the apparatus to at least run a data packet router, the router being configured to at least:
   select a bearer plug-in module from a set of multiple available bearer plug-in modules, the selected module enabling a connection between the mobile communication device and the apparatus over a bearer;
   use the selected bearer plug-in module to enable connections over the bearer;
   provide an extensible bearer abstraction layer configured to be augmented with new bearer abstraction code;
   determine that an existing bearer has been upgraded; and
   use a bearer plug-in module to augment the bearer abstraction layer to enable usage of the upgraded existing bearer.

2. The apparatus of claim 1, wherein point-to-point protocol (PPP) serves as a local link protocol to encapsulate data passing over the connection between the mobile communication device and the apparatus, thereby allowing the bearer to be treated as a serial data bearer.

3. The apparatus of claim 1 in which the bearer plug-in modules each enable connection over one of the following bearers:
   (i) direct cable via serial Component Object Model (COM) port;
   (ii) Universal Serial Bus (USB);
   (iii) infrared (IR);
   (iv) short range wireless.

4. The apparatus of claim 1, wherein the memory and stored computer program code are configured, with the processor, to cause the apparatus to automatically recognize availability of a new bearer at least in part by automatically recognizing installation of new bearer hardware, the new bearer being a bearer over which a connection between the apparatus and the mobile communication device is not already enabled, and to select a bearer plug-in module from a set of multiple available bearer plug-in modules at least in part by selecting a bearer plug-in module corresponding to the new bearer.

5. The apparatus of claim 1, wherein the apparatus comprises or is embodied on a personal computer (PC).

6. The apparatus of claim 1, wherein the router comprises a protocol plug-in enabling connection between the mobile communication device and the apparatus over a Transmission Control Protocol/Internet Protocol (TCP/IP) connection protocol.

7. The apparatus of claim 1, wherein the router enables the apparatus and the mobile communication device to share facilities and capabilities.

8. The apparatus of claim 7, wherein the router enables one or more of the following actions:
   browsing the internet from a browser running on the mobile computing device, with the internet connection routing through the apparatus;
   synchronising contacts and diary entries between the mobile computing device and the apparatus;
   backing up data on the mobile computing device onto an internet based back up server or onto the apparatus;
   browsing data on the mobile computing device from the apparatus and directly using that data in an application on the apparatus; or
   writing a message on a messaging application on the apparatus and sending that message from the mobile computing device.

9. The apparatus of claim 1, wherein the router comprises protocol plug-ins which each enable connection between the mobile communication device and the apparatus over one of the following protocols:
   (i) EPOC PLP; or
   (ii) User Datagram Protocol/Internet Protocol (UDP/IP).

10. The apparatus of claim 2, wherein the router enables the mobile communication device to access the WAN via the apparatus without requiring any software specific to the router to be loaded onto or be running on the mobile computing device and wherein the mobile computing device needs only to use its existing serial data connection capabilities.

11. The apparatus of claim 1, wherein the router is run solely from a removable storage media connected to the apparatus without requiring any software installation on the mobile computing device or third party dependencies in order to execute.

12. The apparatus of claim 6, wherein Internet Protocol (IP) packets sent over the TCP/IP connection protocol carry data and/or voice.

13. The apparatus of claim 1, wherein the router causes one or more serial ports-on the apparatus to open as a modem and the router operates as a proxy for the mobile computing device connected to the apparatus.

14. The apparatus of claim 1, wherein the apparatus is also connected to a Local Area Network (LAN) and the router enables the mobile communication device to access the LAN via the apparatus.

15. The apparatus of claim 1, wherein the router assigns temporary non-routable virtual Internet Protocol (IP) addresses to one or more locally connected mobile communication devices.

16. The apparatus of claim 15, wherein the router intercepts all incoming data packets for a given channel and forwards the intercepted data packets to the correct locally connected device associated with that channel.

17. The apparatus of claim 1, further comprising a plug-in module for each different host/locally connectable mobile communication device.

18. A method comprising:
   enabling a mobile computing device to access a Wide Area Network (WAN) using a data packet router forming a part of a computer connected to the WAN, the enabling comprising:
   selecting a bearer plug-in module from a set of multiple available bearer plug-in modules, the selected bearer plug-in module enabling a connection between the mobile communication device and the computer over a bearer;
   using the selected bearer plug-in module to enable connections over the bearer;
   providing an extensible bearer abstraction layer in the router configured to be augmented with new bearer abstraction code;
   determining that an existing bearer has been upgraded; and
   using, by a processor, a bearer plug-in module to augment the bearer abstraction layer to enable usage of the upgraded existing bearer.

19. The method of claim 18 further comprising configuring the router to-use Point-to-Point Protocol (PPP) as a local link protocol to encapsulate data passing over the connection between the mobile communication device and the computer, thereby allowing the bearer to be treated as a serial data bearer.

20. The method of claim 18, wherein the bearer plug-in modules each enable connection over one of the following bearers:
   (i) direct cable via serial Component Object Model (COM) port;
   (ii) Universal Serial Bus (USB);
   (iii) infrared (IR); or
   (iv) short range wireless.

21. The method of claim 18, further comprising:
   automatically recognizing availability of a new bearer to the mobile computing device at least in part by automatically recognizing installation of new bearer hardware, the new bearer being a bearer over which a connection between the apparatus and the mobile communication device is not already enabled, and
   wherein selecting a bearer plug-in module from a set of multiple available bearer plug-in modules comprises selecting a bearer plug-in module corresponding to the new bearer.

22. The method of claim 18, further comprising configuring the router to use a protocol plug-in which enables connection between the mobile communication device and the computer over a Transmission Control Protocol/Internet Protocol (TCP/IP) connection protocol.

23. The method of claim 18, further comprising configuring the computer and the mobile communication device to share facilities and capabilities.

24. The method of claim 23, further comprising configuring said mobile computing device to perform one or more of the following actions:

browsing the internet from a browser running on the mobile computing device, with the internet connection routing through the computer;

synchronising contacts and diary entries between the mobile computing device and the computer;

backing up data on the mobile computing device onto an internet based back up server or onto the computer;

browsing data on the mobile computing device from the computer and directly using that data in an application on the computer; or writing a message on a messaging application on the computer and sending that message from the mobile computing device.

25. The method of claim 18, further comprising configuring the router to select a further protocol plug-in from a set of protocol plug-ins which each enable connection between the mobile communication device and the computer over one of the following protocols:

(i) EPOC PLP; or (ii) User Datagram Protocol/Internet Protocol (UDP/IP).

26. The method of claim 19, further comprising configuring the mobile communication device to access the WAN via the computer without using any software specific to the router running on the mobile computing device but instead using its existing serial data connection capabilities.

27. The method of claim 18, further comprising configuring the router to run solely from a removable storage media connected to the computer without requiring any software installation on the mobile computing device or third party dependencies in order to execute.

28. The method of claim 22, further comprising carrying data and/or voice in Internet Protocol (IP) packets sent over the TCP/IP connection protocol.

29. The method of claim 18, further comprising configuring the router to open one or more serial ports on the computer as a modem, causing the router to operate as a proxy for the mobile computing device connected to the computer.

30. The method of claim 18, further comprising configuring the mobile computing device to access a Local Area Network (LAN) via the computer.

31. The method of claim 18, further comprising configuring the router to assign temporary non-routable virtual Internet Protocol (IP) addresses to one or more locally connected mobile communication devices.

32. The method of claim 31, further comprising configuring the router to intercept all incoming data packets for a given channel and forward the intercepted data packets to the correct locally connected device associated with that channel.

33. The method of claim 18, further comprising configuring the router to select a plug-in module from a set of plug-in modules, each specific to a different host/locally connectable mobile communication device.

34. A computer program product comprising a non-transitory, tangible computer-readable storage medium having computer-readable program code embodied in the medium, the computer-readable program code comprising:

computer-readable program code that enables a data packet router to perform the method of claim 18 when running on the computer.

* * * * *